(12) United States Patent
Harbaugh

(10) Patent No.: US 10,065,566 B1
(45) Date of Patent: Sep. 4, 2018

(54) HITCH MOUNTABLE CARRIER WAGON

(71) Applicant: Adam Harbaugh, Thurmont, MD (US)

(72) Inventor: Adam Harbaugh, Thurmont, MD (US)

( * ) Notice: Subject to any disclaimer, the term of this patent is extended or adjusted under 35 U.S.C. 154(b) by 0 days.

(21) Appl. No.: 15/654,410

(22) Filed: Jul. 19, 2017

(51) Int. Cl.
  *B60R 9/00* (2006.01)
  *B60R 9/06* (2006.01)
  *B62B 5/00* (2006.01)
  *B60D 1/46* (2006.01)
  *B60D 1/00* (2006.01)

(52) U.S. Cl.
  CPC ............... *B60R 9/06* (2013.01); *B60D 1/46* (2013.01); *B62B 5/0003* (2013.01); *B60D 1/00* (2013.01); *B62B 5/00* (2013.01)

(58) Field of Classification Search
  CPC .... B60R 9/06; B60D 1/46; B60D 1/00; B62B 5/0003; B62B 5/00
  USPC ........................................................ 224/519
  See application file for complete search history.

(56) References Cited

U.S. PATENT DOCUMENTS

| | | | | |
|---|---|---|---|---|
| 6,361,264 B1 * | 3/2002 | Guthrie | ................... | B60R 9/065 224/521 |
| 6,471,104 B1 * | 10/2002 | Janek | ...................... | B60R 9/065 220/8 |
| 6,502,730 B2 * | 1/2003 | Johnson | .................... | B60R 9/06 224/402 |
| 6,612,615 B1 * | 9/2003 | Dimand | .................... | B60R 9/06 224/531 |
| 6,802,441 B1 * | 10/2004 | DuRant | ................... | B60R 9/065 224/513 |
| 7,188,856 B2 * | 3/2007 | Maynard | ................. | B60P 3/077 280/402 |
| 7,380,803 B2 * | 6/2008 | Thomas | .................... | B60R 9/06 224/519 |
| 7,780,394 B1 * | 8/2010 | Becker | .................. | B60P 1/4414 224/509 |
| 8,132,997 B2 * | 3/2012 | Reuille | ................. | B60P 1/4421 224/537 |
| 8,505,932 B1 * | 8/2013 | Piccirillo | .............. | B62B 5/0003 280/30 |
| 8,746,377 B1 * | 6/2014 | Dunbar | ................. | B62B 5/0003 180/19.2 |
| 8,985,418 B1 * | 3/2015 | Poudrier | .................. | B60D 1/58 224/521 |
| 9,216,698 B2 * | 12/2015 | Rhodes | ................... | B60R 9/065 |

(Continued)

*Primary Examiner* — Peter Helvey
(74) *Attorney, Agent, or Firm* — Ming Chow; Sinorica, LLC

(57) ABSTRACT

A carrier attachment method which allows a user to easily and quickly attach and detach a carrier wagon to and from a vehicle. The method includes a tubular mounting hitch, a vertical rail, a motorized linear actuator, an L-shaped mounting beam, an interconnecting plate, and the carrier wagon. The motorized linear actuator raises and lowers the carrier wagon. The vertical rail is terminally and perpendicularly connected to the tubular mounting hitch. The tubular mounting hitch is attached to a vehicle hitch. The motorized linear actuator is positioned parallel and offset to the vertical rail. A foot of the motorized linear actuator is attached to the tubular mounting hitch. The L-shaped mounting beam attaches to the carrier wagon and is positioned adjacent to the vertical rail. The interconnecting plate is mounted in between the L-shaped mounting beam and the motorized linear actuator, and further is slidably mounted along the vertical rail.

15 Claims, 6 Drawing Sheets

(56) References Cited

U.S. PATENT DOCUMENTS

| | | | | |
|---|---|---|---|---|
| 9,850,115 | B2* | 12/2017 | Cho | B66F 13/00 |
| 9,944,138 | B2* | 4/2018 | Kemper | H05K 999/99 |
| 2002/0172581 | A1* | 11/2002 | Maney | B60P 1/4421 |
| | | | | 414/462 |
| 2004/0173654 | A1* | 9/2004 | McAlister | B60D 1/52 |
| | | | | 224/519 |
| 2004/0232185 | A1* | 11/2004 | Darby | B60R 9/06 |
| | | | | 224/521 |
| 2006/0118586 | A1* | 6/2006 | Heravi | B60R 9/0426 |
| | | | | 224/519 |
| 2008/0100076 | A1* | 5/2008 | Potts | B60R 9/06 |
| | | | | 296/3 |
| 2009/0152314 | A1* | 6/2009 | Myrex | B60R 9/06 |
| | | | | 224/502 |
| 2009/0159627 | A1* | 6/2009 | Myrex | B60R 9/06 |
| | | | | 224/495 |
| 2010/0066069 | A1* | 3/2010 | Bradshaw | B60R 9/06 |
| | | | | 280/769 |
| 2010/0155443 | A1* | 6/2010 | Lasater | B62J 7/04 |
| | | | | 224/448 |
| 2012/0305612 | A1* | 12/2012 | Bell, Jr. | B60R 9/06 |
| | | | | 224/519 |

* cited by examiner

HITCH MOUNTABLE CARRIER WAGON

FIELD OF THE INVENTION

The present invention relates to hitch mechanisms for a vehicle. More specifically, the present invention is a hitch mechanism for easily and quickly mounting a carrier wagon to the rear of a vehicle.

BACKGROUND OF THE INVENTION

Individuals and industries have a continuing interest and need in having a carrier wagon which can be easily and rapidly hitched to the rear of a passenger vehicle, station wagon, light truck, and or sports utility vehicle. Not only for business applications, the carrier wagon may be used for carrying goods during vacations such as camping trips and beach trips. Traditional solutions include complex devices for hooking up the carrier wagon to the hitch of a vehicle. Additionally, these solutions require the user to attach and raise the carrier wagon manually, which is not always simple if the carrier wagon is used to store and transport various items. Furthermore, traditional solutions often position the carrier wagon such that the brake lights and the turn signals of the vehicle are covered. This is illegal and dangerous as drivers/vehicles behind the carrier wagon cannot receive the appropriate signals when the user's car is slowing down or turning.

The present invention provides an alternative design for hitching a carrier wagon to a vehicle and solves the aforementioned problems. The present invention provides an easy and safe means for attaching a carrier wagon to the hitch of a vehicle, thus allowing the user to transport the carrier wagon and additional contents. The present invention achieves this through a motorized linear actuator and a plurality of lights. The motorized linear actuator raises and lowers the carrier wagon quickly and easily. The motorized linear actuator can be disassembled for easy storage and transportation. The plurality of lights is connected to the carrier wagon to act as the brake lights and or turn signals of the vehicle. Another advantage of the present invention is the use of a latch for the handle of the carrier wagon.

DETAIL DESCRIPTIONS OF THE INVENTION

All illustrations of the drawings are for the purpose of describing selected versions of the present invention and are not intended to limit the scope of the present invention.

The present invention relates to goods carrying wagons and a means for easy and quickly attaching said goods carrying wagons to the rear of a vehicle. The present invention provides a mechanism for attaching a carrier wagon 12 to a vehicle hitch for safe transportation. The present invention may be implemented to be compatible with a variety of different types of vehicles as well as a variety of different types of vehicle hitch designs. Type of vehicles include, but are not limited to, passenger vehicles, station wagons, trucks, sports utility vehicles, vans, and minivans.

Figure 1:
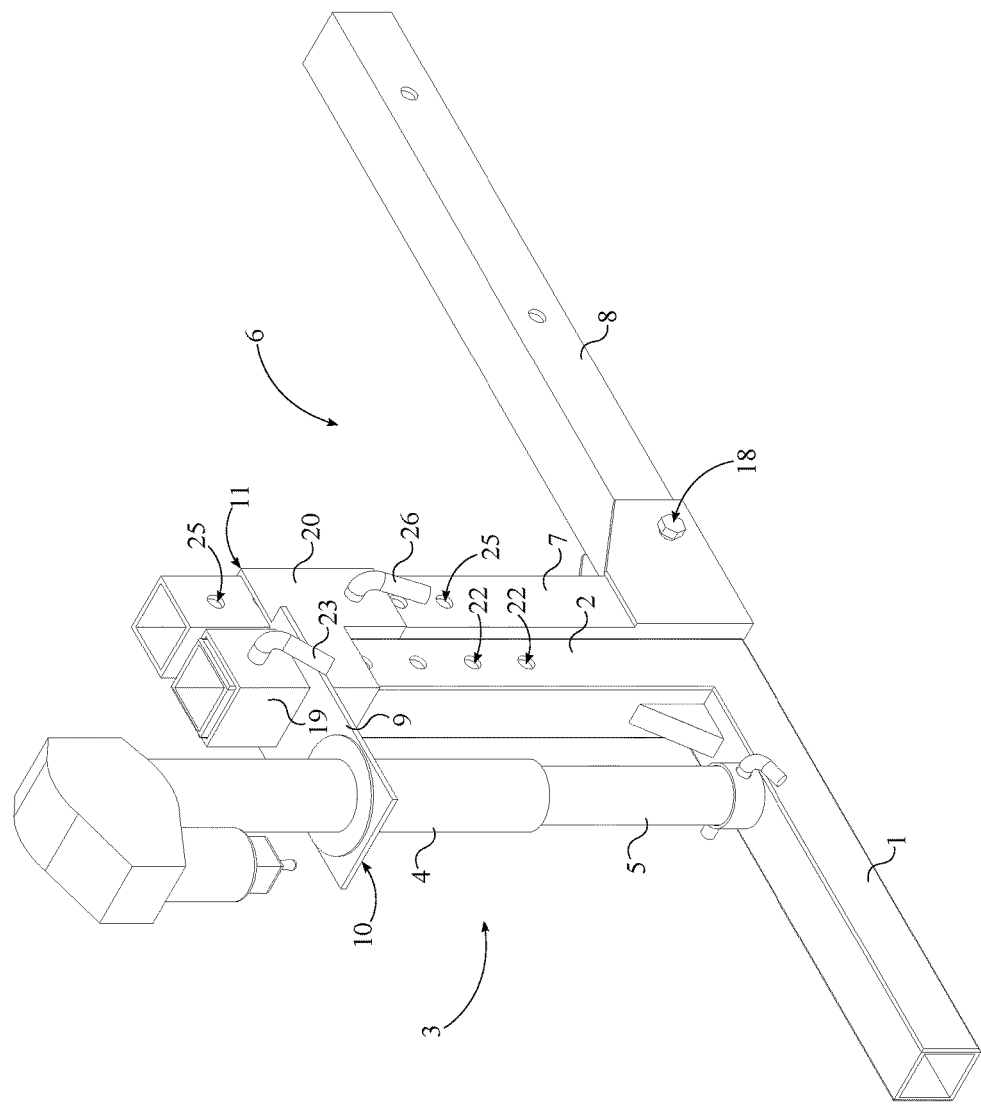
FIG. 1 is a perspective view of the present invention with a carrier wagon omitted.
Figure 2:
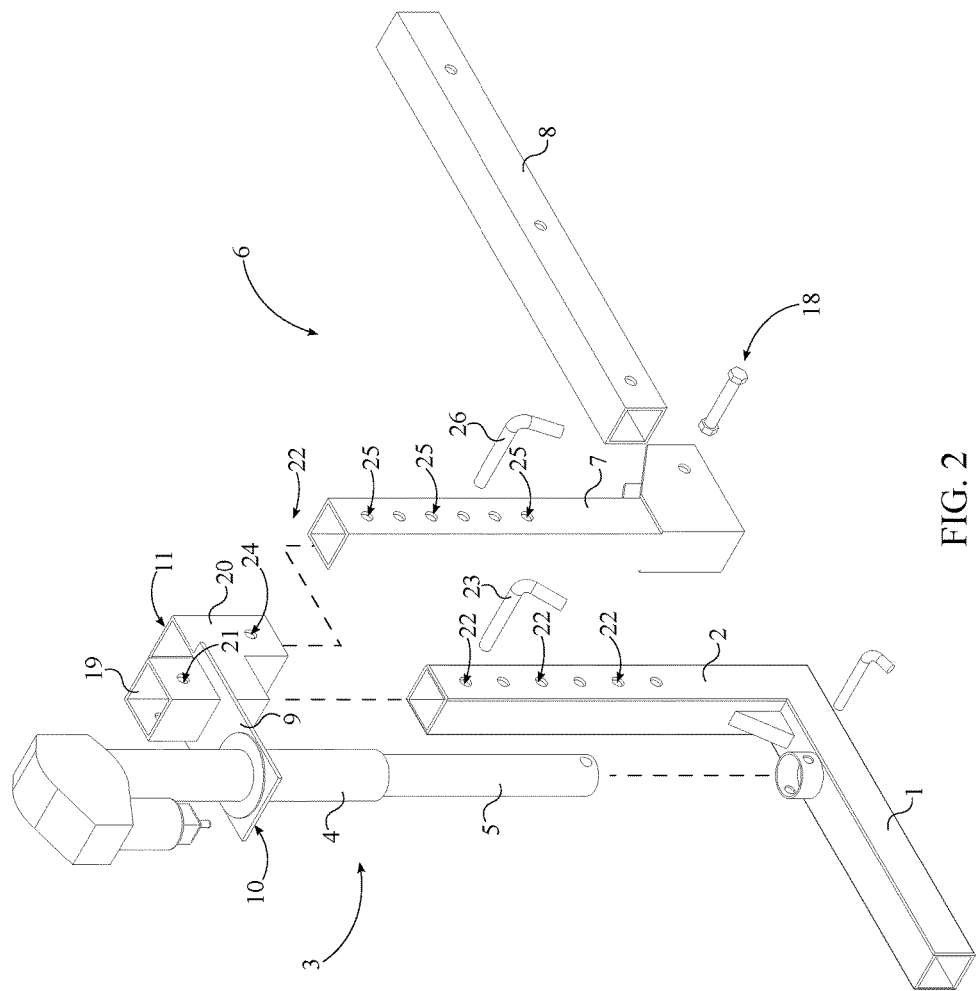
FIG. 2 is an exploded perspective view of the present invention with the carrier wagon omitted.
Figure 3:
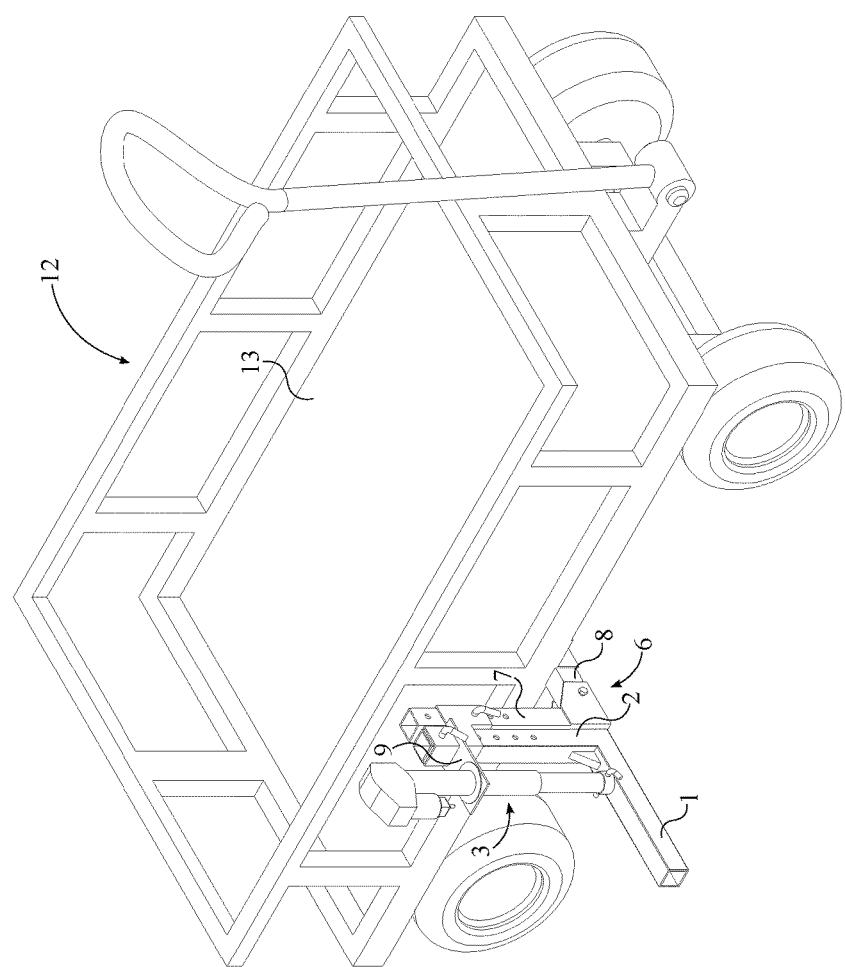
FIG. 3 is a perspective view the present invention with the carrier wagon in a raised position.

Referring to FIG. 1 and FIG. 3, the present invention comprises a carrier wagon 12, a tubular mounting hitch 1, a vertical rail 2, a motorized linear actuator 3, an L-shaped mounting beam 6, and an interconnecting plate 9. The carrier wagon 12 is used to transport goods, supplies, toys, food, and other items. In the simplest embodiment, the carrier wagon 12 comprises a plurality of wheels and a flat bed 13. The plurality of wheels are perimetrically distributed about the flat bed 13 with each of the plurality of wheels being laterally and rotatably connected to the flat bed 13. The present invention may be implemented with a variety of different carrier wagon 12 sizes and designs. The tubular mounting hitch 1 attaches the present invention to a receiver tube of a vehicle hitch. Thus, the tubular mounting hitch 1 bears the weight of the present invention and the items stored within the wagon. The tubular mounting hitch 1 may be implemented in a variety of shapes and sizes in order to compliment different types of vehicle hitch designs. In the preferred embodiment of the present invention, the tubular mounting hitch 1 has a square cross-sectional profile and is sized to fit within a standard tubular receiver. The vertical rail 2 is a rectangular extrusion which acts as a guide for the interconnecting plate 9 when raising or lowering the carrier wagon 12. Additionally, the vertical rail 2 acts as a structural element to laterally bear weight of the carrier wagon 12. Referring to FIG. 2, the vertical rail 2 is terminally and perpendicularly connected to the tubular mounting hitch 1.

Figure 4:
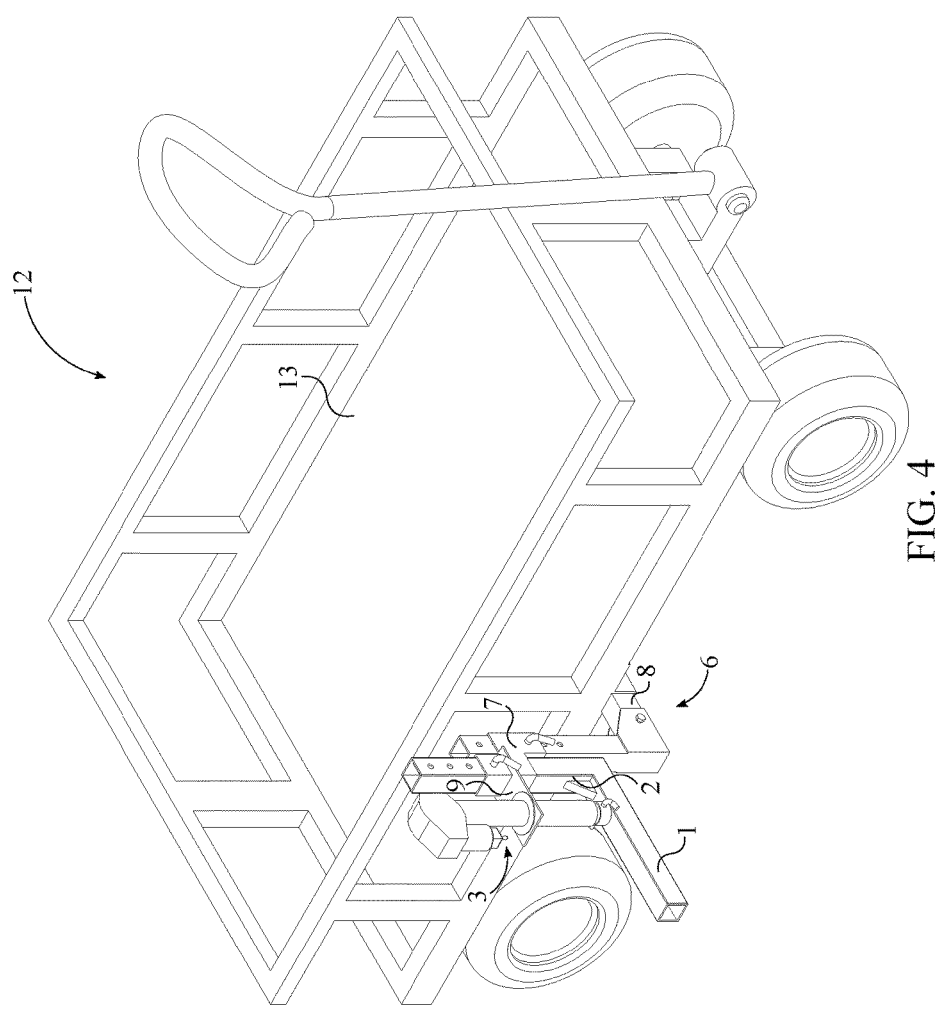
FIG. 4 is a perspective view the present invention with the carrier wagon in a lowered position.

The motorized linear actuator 3 is a mechanical device which converts rotational motion of an electric motor into linear translation. Referring to FIG. 3 and FIG. 4, said linear translation is used to raise and lower the carrier wagon 12 to a desired height, thus reducing the manual labor required from the user. The motorized linear actuator 3 is positioned parallel and offset to the vertical rail 2. The motorized linear actuator 3 comprises a tubular housing 4, a foot 5, and an electric motor. The foot 5 is a cylindrical shaft that is slidably engaged within the tubular housing 4. The motor converts electrical energy into rotational motion. The motor is terminally mounted to the tubular housing 4, opposite the foot 5, and is mechanically coupled to the foot 5 through a series of gears and a threaded shank. The foot 5 is terminally attached to the tubular mounting hitch 1 in order to push the motor housing away and towards the tubular mounting hitch 1. The motion of the tubular housing 4 is transferred to the carrier wagon 12 through the interconnecting plate 9 and the L-shaped mounting beam 6.

Figure 5:
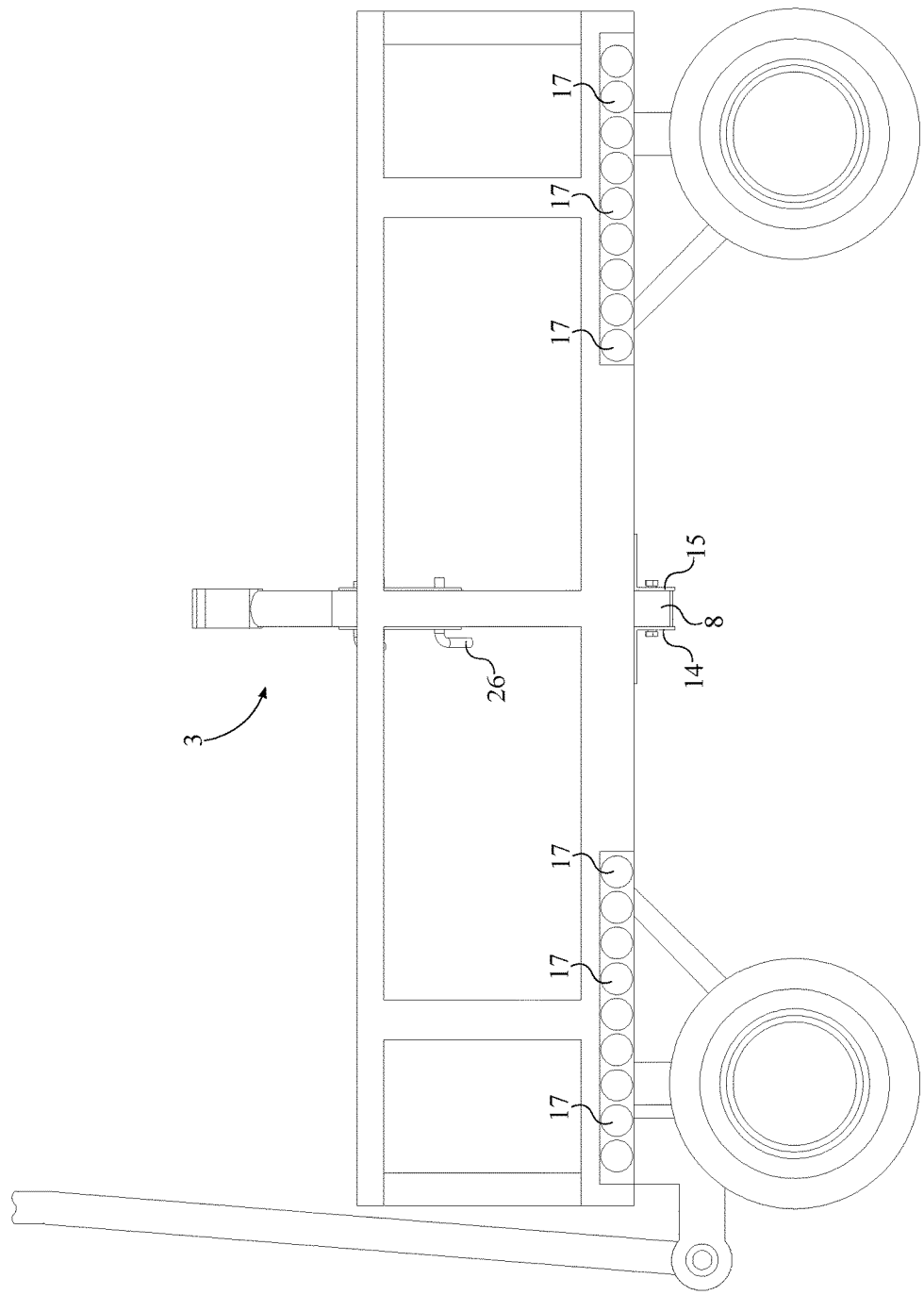
FIG. 5 is a rear view of the present invention.

Referring to FIG. 2 and FIG. 5, the L-shaped mounting beam 6 connects the carrier wagon 12 to the motor housing, thus following the linear translation of the motor housing. The L-shaped mounting beam 6 comprises a vertical leg 7 and a wagon-mounting leg 8. The vertical leg 7 is positioned parallel and adjacent to the vertical rail 2, opposite the motorized linear actuator 3. This positions the vertical leg 7 at the same height as the tubular housing 4. The vertical leg 7 is connected to the tubular housing 4 through the interconnecting plate 9. More specifically, the interconnecting plate 9 is mounted in between the vertical leg 7 and the tubular housing 4. The wagon-mounting leg 8 attaches to the carrier wagon 12 and is thus oriented away from the tubular mounting hitch 1. This configuration rigidly connects the tubular housing 4, the interconnecting plate 9, the vertical leg 7, the wagon-mounting leg 8, and therefore the carrier wagon 12 together. As a result, when the motorized linear actuator 3 is activated, the aforementioned connected components raise and lower together. In order to ensure that the very little force is applied to the motorized linear actuator 3, the vertical rail 2 is used as a structural element to bear the weight of the carrier wagon 12. In particular, this is achieved by the interconnecting plate 9 being slidably mounted along the vertical rail 2. As the interconnecting plate 9 raises and lowers, the vertical rail 2 guides the interconnecting plate 9 and bears the lateral force from the weight of the carrier wagon 12.

Referring to FIG. 5, the wagon-mounting leg 8 is attached to the carrier wagon 12 through the user of a first bracket 14 and a second bracket 15. The first bracket 14 and the second bracket 15 are each an elongated plate attached to the flat bed 13. More specifically, the first bracket 14 and the second bracket 15 are positioned parallel and offset to each other in order to receive the wagon-mounting leg 8 in between. The first bracket 14 and the second bracket 15 are adjacently connected to the flat bed 13, in particular to a bottom surface of the flat bed 13. It is preferred that the first bracket 14 and the second bracket 15 are centrally positioned on the flat bed 13 to ensure symmetrical support for the carrier wagon 12. The wagon-mounting leg 8 is then positioned in between the first bracket 14 and the second bracket 15. The wagon-mounting leg 8 is attached to the first bracket 14 and the second bracket 15, adjacent to the flat bed 13. Preferably, the wagon-mounting leg 8 is attached to the first bracket 14 and the second bracket 15 through a plurality of nuts and bolts fasteners.

The wagon-mounting leg 8 and the vertical leg 7 may be implemented as a single component or as two separate components which attach to each other. In the preferred embodiment, the wagon-mounting leg 8 and the vertical leg 7 are separate components that may be attached to each other through a pin-and-slot locking mechanism 18. This is to allow for easy assembly and disassembly of the present invention. In particular, this allows the wagon-mounting leg 8 to be attached to the carrier wagon 12 semi-permanently to allow the user to quickly attach the carrier wagon 12 to the vertical leg 7 once the rest of the present invention is mounted to the vehicle hitch. Referring to FIG. 2, the wagon-mounting leg 8 and the vertical leg 7 are terminally and perpendicularly attached to each other. The pin-and-slot locking mechanism 18 is a lock which connects two components through an obstruction. A variety of different lock mechanisms may also be utilized to attach the wagon-mounting leg 8 and the vertical leg 7. The pin-and-slot locking mechanism 18 is preferred as it is capable of withstanding the forces associated with carrying and transporting a significant amount of weight. Thus, the pin-and-slot locking mechanism 18 is mechanically integrated in between the wagon-mounting leg 8 and the vertical leg 7.

Referring to FIG. 2, the present invention further comprises a first tubular adaptor 19, a first slot 21, a plurality of secondary slots 22, a first pin 23, a second tubular adaptor 20, a third slot 24, a plurality of fourth slots 25, and a second pin 26. The first tubular adaptor 19 and the second tubular adaptor 20 are each a hollow rectangular extrusion used to mount the interconnecting plate 9 and to ensure that the present invention is structurally sound to support a significant amount of weight. The first slot 21, the plurality of secondary slots 22, and the first pin 23 are used to lock first tubular adaptor 19 to the vertical rail 2. Similarly, the third slot 24, the plurality of fourth slots 25, and the second pin 26 are used to lock the second tubular adaptor 20 to the vertical leg 7. A first end 10 of the interconnecting plate 9 is laterally connected to the tubular housing 4 of the motorized linear actuator 3. The first tubular adaptor 19 is used to slidably mount the interconnecting plate 9 to the vertical rail 2. In particular, the first tubular adaptor 19 is oriented parallel to the vertical rail 2 and is mechanically integrated into a second end 11 of the interconnecting plate 9. The first tubular adaptor 19 is sized and shaped complimentary to the vertical rail 2 in order to sleeve the vertical rail 2. The vertical rail 2 is positioned within the first tubular adaptor 19 and, as a result, the first tubular adaptor 19 is slidably engaged along the vertical rail 2.

The first slot 21, the plurality of secondary slots 22, and the first pin 23 act as a first locking mechanism in between the first tubular adaptor 19 and the vertical rail 2. Once the interconnecting plate 9 and therefore the carrier wagon 12 is at the desired height, the user then secures the first tubular adaptor 19 to the vertical rail 2 by the first locking mechanism. Referring to FIG. 2, the first slot 21 laterally traverses through the first tubular adaptor 19. Additionally, the plurality of secondary slots 22 is distributed along the vertical rail 2 with each of the plurality of second slots traversing through the vertical rail 2. The first slot 21, each of the plurality secondary slots, and the first pin 23 all share an identical profile. In order to engage the first locking mechanism, the first pin 23 traverses through the first slot 21 and a selected secondary slot from the plurality of secondary slots 22, thus locking the desired configuration in place for transport or storage.

The second tubular adaptor 20 mounts the interconnecting plate 9 to the vertical leg 7. More specifically, the second tubular adaptor 20 is positioned parallel to the first tubular adaptor 19, opposite the tubular housing 4. The second tubular adaptor 20 is adjacently connected to the first tubular adaptor 19 and is sized and shaped to compliment and sleeve the vertical leg 7. The vertical leg 7 is positioned within the second tubular adaptor 20 and, as a result, the second tubular adaptor 20 is slidably engaged along the vertical leg 7. This configuration allows the user to manually lower and raise the vertical leg 7 and therefore the wagon-mounting leg 8. This is useful in cases if additional vertical length is necessary to reach the carrier wagon 12 when the vehicle hitch is significantly off the ground.

The third slot 24, the plurality of fourth slots 25, and the second pin 26 act as a second locking mechanism in between the second tubular adaptor 20 and the vertical leg 7. Once the interconnecting plate 9 and therefore the carrier wagon 12 is at the desired height, the user then secures the second tubular adaptor 20 to the vertical rail 2 by the second locking mechanism. Referring to FIG. 2, the third slot 24 laterally traverses through the second tubular adaptor 20. Additionally, the plurality of fourth slots 25 is distributed along the vertical leg 7 with each of the plurality of fourth slots 25 traversing through the vertical leg 7. The third slot 24, each of the plurality fourth slots, and the second pin 26 all share an identical profile. In order to engage the second locking mechanism, the second pin 26 traverses through the third slot 24 and a selected fourth slot from the plurality of fourth slots 25, thus locking the desired configuration in place for transport or storage.

Figure 6:
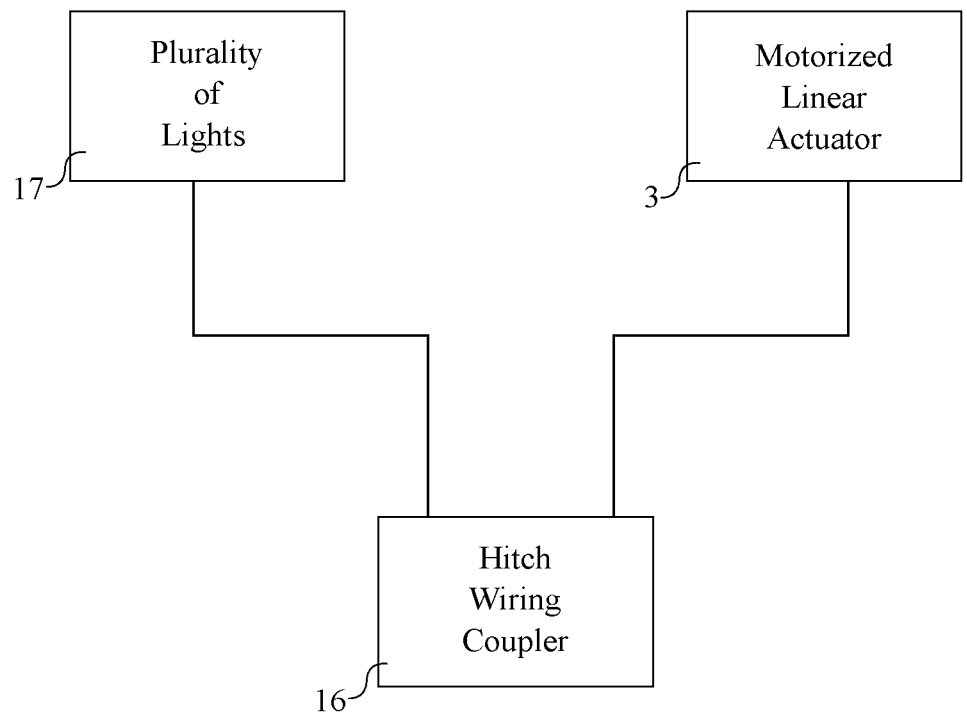
FIG. 6 is an electronic schematic of the present invention.

Referring to FIG. 6, the present invention further comprises a hitch wiring coupler 16 and a plurality of lights 17. The hitch wiring coupler 16 allows the electrical components of the present invention to electrically and electronically connect to the vehicle's internal battery and operating computer. The hitch wiring coupler 16 is tethered to the tubular housing 4 in order to position the hitch wiring coupler 16 adjacent to the vehicle hitch. The hitch wiring coupler 16 may be implemented in a variety of means in order to compliment the type of wiring used by the vehicle. When the present invention is in use, the hitch wiring coupler 16 is connected to the vehicle's wiring adapter. One of the main components connected to the hitch wiring coupler 16 is the motorized linear actuator 3. In particular, the motorized linear actuator 3 is electrically connected to the hitch wiring coupler 16.

The plurality of lights 17 acts as the signal lights and or brake lights of the vehicle as the carrier wagon 12 can block the lights of the vehicle. In particular, the plurality of lights 17 is distributed along the carrier wagon 12. Additionally, the plurality of lights 17 is positioned opposite the vertical leg 7, across the flat bed 13. This positions the plurality of lights 17 facing away from the vehicle and towards traffic behind the carrier wagon 12. Each of the plurality of lights 17 is laterally connected to the flat bed 13 with each of the plurality of lights 17 being electrically and electronically connected to the hitch wiring coupler 16.

In one embodiment of the present invention, the carrier wagon 12 further comprises a handle. The handle is rotatably connected to the flat bed 13 in order to act as a grasping element for the carrier wagon 12. In order to ensure that the handle is secured during transportation of the carrier wagon 12, a locking joint is integrated into the junction between the handle and the flat bed 13.

Although the invention has been explained in relation to its preferred embodiment, it is to be understood that many other possible modifications and variations can be made without departing from the spirit and scope of the invention as hereinafter claimed.

What is claimed is:

1. A hitch mountable carrier wagon comprises:
a tubular mounting hitch;
a vertical rail;
a motorized linear actuator;
an L-shaped mounting beam;
an interconnecting plate;
the motorized linear actuator comprises a tubular housing and a foot;
the L-shaped mounting beam comprises a vertical leg and a wagon-mounting leg;
the vertical rail being terminally and perpendicularly connected to the tubular mounting hitch;
the motorized linear actuator being positioned parallel and offset to the vertical rail;
the foot being slidably engaged within the tubular housing;
the foot being terminally attached to the tubular mounting hitch;
the vertical leg being positioned parallel and adjacent to the vertical rail, opposite the motorized linear actuator;
the interconnecting plate being mounted in between the vertical leg and the tubular housing;
the interconnecting plate being slidably mounted along the vertical rail; and
the wagon-mounting leg being oriented away from the tubular mounting hitch.

2. The carrier wagon as claimed in claim 1 comprises:
a carrier wagon;
a first bracket;
a second bracket;
the first bracket and the second bracket being positioned parallel and offset to each other;
the first bracket and the second bracket being adjacently connected to a flat bed of the carrier wagon;
the wagon-mounting leg being positioned in between the first bracket and the second bracket; and
the wagon-mounting leg being attached to the first bracket and the second bracket, adjacent to the flat bed.

3. The carrier wagon as claimed in claim 2 comprises:
a hitch wiring coupler;
a plurality of lights;
the hitch wiring coupler being tethered to the tubular housing;
the plurality of lights being distributed along the carrier wagon;
the plurality of lights being positioned opposite the vertical leg, across the flat bed;
each of the plurality of lights being laterally connected to the flat bed; and
each of the plurality of lights being electrically and electronically connected to the hitch wiring coupler.

4. The carrier wagon as claimed in claim 1 comprises:
a hitch wiring coupler;
the hitch wiring coupler being tethered to the tubular housing; and
the motorized linear actuator being electrically connected to the hitch wiring coupler.

5. The carrier wagon as claimed in claim 1 comprises:
a pin-and-slot locking mechanism;
the wagon-mounting leg and the vertical leg being terminally and perpendicularly attached to each other; and
the pin-and-slot locking mechanism being mechanically integrated in between the wagon-mounting leg and the vertical leg.

6. The carrier wagon as claimed in claim 1 comprises:
a first tubular adaptor;
a second tubular adaptor;
a first end of the interconnecting plate being laterally connected to the tubular housing;
the first tubular adaptor being oriented parallel to the vertical rail;
the first tubular adaptor being mechanically integrated into a second end of the interconnecting plate;
the vertical rail being positioned within the first tubular adaptor;
the first tubular adaptor being slidably engaged along the vertical rail;
the second tubular adaptor being positioned parallel to the first tubular adaptor, opposite the tubular housing;
the second tubular adaptor being adjacently connected to the first tubular adaptor;
the vertical leg being positioned within the second tubular adaptor; and
the second tubular adaptor being slidably engaged along the vertical leg.

7. The carrier wagon as claimed in claim 6 comprises:
a first slot;
a plurality of secondary slots;
a first pin;
the first slot laterally traversing through the first tubular adaptor;
the plurality of secondary slots being distributed along the vertical rail;
each of the plurality of secondary slots laterally traversing through the vertical rail; and
the first pin traversing through the first slot and a selected secondary slot from the plurality of secondary slots.

8. The carrier wagon as claimed in claim 7 comprises:
a third slot;
a plurality of fourth slots;
a second pin;

the third slot laterally traversing through the second tubular adaptor;

the plurality of fourth slots being distributed along the vertical leg;

each of the plurality of fourth slots laterally traversing through the vertical leg; and the second pin traversing through the third slot and a selected fourth slot from the plurality of fourth slots.

9. A hitch mountable carrier wagon comprises:

a tubular mounting hitch;

a vertical rail;

a motorized linear actuator;

an L-shaped mounting beam;

an interconnecting plate;

a first tubular adaptor;

a second tubular adaptor;

the motorized linear actuator comprises a tubular housing and a foot;

the L-shaped mounting beam comprises a vertical leg and a wagon-mounting leg;

the vertical rail being terminally and perpendicularly connected to the tubular mounting hitch;

the motorized linear actuator being positioned parallel and offset to the vertical rail;

the foot being slidably engaged within the tubular housing;

the foot being terminally attached to the tubular mounting hitch;

the vertical leg being positioned parallel and adjacent to the vertical rail, opposite the motorized linear actuator;

the interconnecting plate being mounted in between the vertical leg and the tubular housing;

the interconnecting plate being slidably mounted along the vertical rail;

the wagon-mounting leg being oriented away from the tubular mounting hitch;

a first end of the interconnecting plate being laterally connected to the tubular housing;

the first tubular adaptor being oriented parallel to the vertical rail;

the first tubular adaptor being mechanically integrated into a second end of the interconnecting plate;

the vertical rail being positioned within the first tubular adaptor;

the first tubular adaptor being slidably engaged along the vertical rail;

the second tubular adaptor being positioned parallel to the first tubular adaptor, opposite the tubular housing;

the second tubular adaptor being adjacently connected to the first tubular adaptor;

the vertical leg being positioned within the second tubular adaptor; and the second tubular adaptor being slidably engaged along the vertical leg.

10. The carrier wagon as claimed in claim 9 comprises:

a carrier wagon;

a first bracket;

a second bracket;

the first bracket and the second bracket being positioned parallel and offset to each other;

the first bracket and the second bracket being adjacently connected to a flat bed of the carrier wagon;

the wagon-mounting leg being positioned in between the first bracket and the second bracket; and the wagon-mounting leg being attached to the first bracket and the second bracket, adjacent to the flat bed.

11. The carrier wagon as claimed in claim 10 comprises:

a hitch wiring coupler;

a plurality of lights;

the hitch wiring coupler being tethered to the tubular housing;

the plurality of lights being distributed along the carrier wagon;

the plurality of lights being positioned opposite the vertical leg, across the flat bed;

each of the plurality of lights being laterally connected to the flat bed; and each of the plurality of lights being electrically and electronically connected to the hitch wiring coupler.

12. The carrier wagon as claimed in claim 9 comprises:

a hitch wiring coupler;

the hitch wiring coupler being tethered to the tubular housing; and the motorized linear actuator being electrically connected to the hitch wiring coupler.

13. The carrier wagon as claimed in claim 9 comprises:

a pin-and-slot locking mechanism;

the wagon-mounting leg and the vertical leg being terminally and perpendicularly attached to each other; and the pin-and-slot locking mechanism being mechanically integrated in between the wagon-mounting leg and the vertical leg.

14. The carrier wagon as claimed in claim 9 comprises:

a first slot;

a plurality of secondary slots;

a first pin;

the first slot laterally traversing through the first tubular adaptor;

the plurality of secondary slots being distributed along the vertical rail;

each of the plurality of secondary slots laterally traversing through the vertical rail; and the first pin traversing through the first slot and a selected secondary slot from the plurality of secondary slots.

15. The carrier wagon as claimed in claim 9 comprises:

a third slot;

a plurality of fourth slots;

a second pin;

the third slot laterally traversing through the second tubular adaptor;

the plurality of fourth slots being distributed along the vertical leg;

each of the plurality of fourth slots laterally traversing through the vertical leg; and the second pin traversing through the third slot and a selected fourth slot from the plurality of fourth slots.

* * * * *